United States Patent
Matsuoka et al.

(10) Patent No.: US 7,990,686 B2
(45) Date of Patent: Aug. 2, 2011

(54) SOLID ELECTROLYTIC CAPACITOR

(75) Inventors: Keiko Matsuoka, Osaka (JP); Shoji Umeda, Osaka (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 231 days.

(21) Appl. No.: 12/402,659

(22) Filed: Mar. 12, 2009

(65) Prior Publication Data
US 2009/0231784 A1    Sep. 17, 2009

(30) Foreign Application Priority Data

Mar. 12, 2008   (JP) .................................. 2008-063090

(51) Int. Cl.
*H01G 9/00* (2006.01)
(52) U.S. Cl. ........ 361/540; 361/523; 361/525; 361/528; 361/529; 361/541
(58) Field of Classification Search .......... 361/523–529, 361/516–519, 540–541, 508–512
See application file for complete search history.

(56) References Cited

U.S. PATENT DOCUMENTS

| 5,179,507 | A  | * | 1/1993 | Iijima | 361/534 |
| 6,188,566 | B1 | * | 2/2001 | Aoyama | 361/534 |
| 6,625,009 | B2 | * | 9/2003 | Maeda | 361/528 |
| 6,751,086 | B2 | * | 6/2004 | Matsumoto | 361/523 |
| 7,190,571 | B2 | * | 3/2007 | Heusmann et al. | 361/523 |
| 7,352,562 | B2 | * | 4/2008 | Tanaka | 361/540 |

FOREIGN PATENT DOCUMENTS

JP    2003-068576 A    3/2003

* cited by examiner

*Primary Examiner* — Nguyen T Ha
(74) *Attorney, Agent, or Firm* — Westerman, Hattori, Daniels & Adrian, LLP

(57) ABSTRACT

A solid electrolytic capacitor of the present invention includes: a capacitor element having an anode leading part and a cathode leading part; an anode lead frame connected to the anode leading part and a cathode lead frame connected to the cathode leading part; and an packing resin with which the capacitor element is coated, and the anode leading part protrudes from one end face of the capacitor element. The anode lead frame includes: an anode terminal part having an exposed surface exposed from the packing resin, a rising part connected to the anode terminal part, bent toward the anode leading part located in the upper part of the anode terminal part and extending in the packing resin, and a bent part connected to the rising part and bent along a direction which is parallel to a protruding direction of the anode leading part and connected to the anode leading part.

6 Claims, 8 Drawing Sheets

SOLID ELECTROLYTIC CAPACITOR

BACKGROUND OF THE INVENTION

1. Field of the Invention

The present invention relates to a solid electrolytic capacitor having a capacitor element sealed by an packing resin such as a synthetic resin.

2. Description of the Related Art

A solid electrolytic capacitor includes a capacitor element having a dielectric oxide film and a solid electrolytic layer formed on an anode member. As the anode member, a sintered material of a valve action metal such as tantalum, niobium or the like is used. By oxidizing the surface of the anode member so as to form an anode oxide film, the dielectric oxide film is formed. The solid electrolytic layer is an electrically conductive polymer layer such as polypyrrole formed on the anode oxide film by a chemical polymerization. On the solid electrolytic layer, a cathode leading part made of silver or carbon and silver is formed and an anode leading part made of the valve action metal is formed so as to protrude from one end face of the anode member. FIG. 5 is a diagram showing the structure of a usual solid electrolytic capacitor. As shown in FIG. 5(a), the solid electrolytic capacitor includes a capacitor element 53 having an anode leading part 57 and a cathode leading part 56, an anode terminal 51 connected to the anode leading part 57, a cathode terminal 52 connected to the cathode leading part 56 and an packing resin 58 covering the capacitor element 53.

In manufacturing the solid electrolytic capacitor, the capacitor element 53 is disposed on the anode terminal 51 and the cathode terminal 52 arranged on the same plane. However, when the cathode leading part 56 of the capacitor element 53 is supplied so as to come into close contact with the cathode terminal 52, a gap is generated between the anode leading part 57 and the anode terminal 51 so that the anode leading part 57 floats from the anode terminal 51. Accordingly, in order to connect the anode leading part 57 to the anode terminal 51, in the gap between the anode leading part 57 and the anode terminal 51, a sleeper member 54 made of metal as shown in FIG. 5(a) needs to be provided or a special form material 55 made of metal as shown in FIG. 5(b) needs to be used. Therefore, a process for forming the sleeper member 54 or the special form material 55 is necessary, so that a production cost is the more increased. Further, since the sleeper member 54 or the special form material 55 is formed by a welding process between the anode leading part 57 and the anode terminal 51, a process yield is lowered due to unevenness in welding (see patent literature 1).

Patent literature 1: JP-A-2003-68576

SUMMARY OF THE INVENTION

It is an object of the present invention to provide an inexpensive solid electrolytic capacitor that can be easily produced and is good in its yield.

A solid electrolytic capacitor of the present invention comprises: a capacitor element having an anode leading part and a cathode leading part; an anode lead frame connected to the anode leading part and a cathode lead frame connected to the cathode leading part; and an packing resin covering the capacitor element, and the anode leading part protrudes from one end face of the capacitor element. In the solid electrolytic capacitor, the anode lead frame includes: an anode terminal part having an exposed surface exposed from the packing resin, a rising part connected to the anode terminal part, bent toward the anode leading part located in the upper part of the anode terminal part and extending in the packing resin, and a bent part connected to the rising part and bent along a direction that is parallel to a protruding direction of the anode leading part and connected to the anode leading part. The bent part preferably has a slit opened along the protruding direction of the anode leading part from the capacitor element. A maximum opening width of the slit in the horizontal direction is preferably a maximum width of the end face of the anode leading part in the horizontal direction or smaller. Further, a part of the bent part connected to the anode leading part preferably has a curvature. The solid electrolytic capacitor preferably comprises the plurality of the capacitor elements.

According to the present invention, an inexpensive solid electrolytic capacitor can be provided in which a manufacturing process can be simplified, a production can be easily realized and a production speed can be improved. Further, the solid electrolytic capacitor can be provided that is good in its yield and low in its equivalent series resistance (refer it to as "ESR" hereinafter.).

DESCRIPTION OF THE PREFERRED EMBODIMENTS

First Embodiment

Figure 1A:
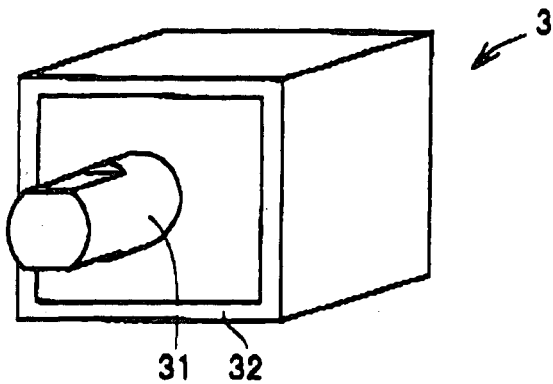
FIG. 1 is a diagram showing the structure of a solid electrolytic capacitor in a first embodiment.
Figure 1B:
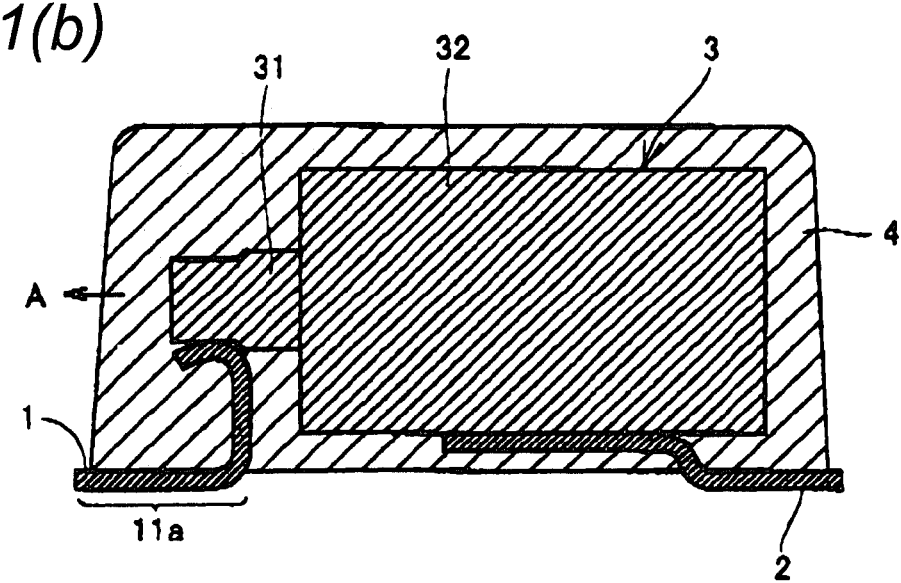

The structure of a solid electrolytic capacitor in a first embodiment is shown in FIG. 1. FIG. 1(a) is a perspective view of a capacitor element 3 forming the solid electrolytic capacitor. As shown in FIG. 1(a), the capacitor element 3 includes an anode leading part 31 and a cathode leading part 32. The anode leading part 31 has a structure protruding from one end face of the capacitor element 3. In this specification, the capacitor element indicates various kinds of solid electrolytic capacitor elements having a structure in which an anode is made of a valve action metal, a dielectric film is formed on the surface of an anode metal, then, a solid electrolytic layer as a cathode is formed on the surface of the dielectric film and a cathode leading layer is formed on the surface of the solid electrolytic layer. FIG. 1(b) is a sectional view showing the structure of the solid electrolytic capacitor of this embodiment. As shown in FIG. 1(b), the solid electrolytic capacitor includes the capacitor element 3 having the anode leading part 31 and the cathode leading part 32, an anode lead frame 1 connected to the anode leading part 31, a cathode lead frame 2 connected to the cathode leading part 32 and an packing resin 4 covering the capacitor element 3. Here, as shown in FIG. 1(a), the anode leading part 31 may have an end collapsed or a collapsed part may not be included.

Figure 1C:
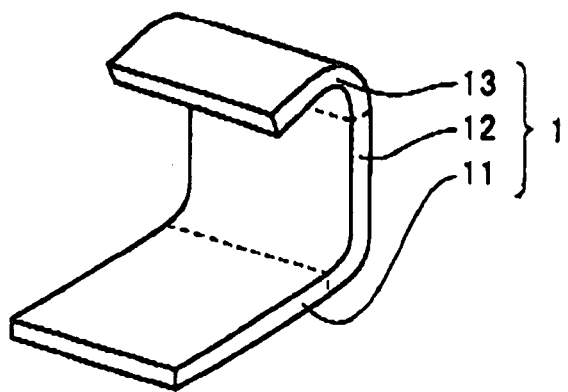

FIG. 1(c) is a perspective view of the anode lead frame 1 forming the solid electrolytic capacitor. As shown in FIG. 1(c), the anode lead frame 1 includes an anode terminal part 11, a rising part 12 and a bent part 13. As shown FIGS. 1(b) and 1(c), the anode terminal part 11 has an exposed surface 11a exposed from the packing resin 4. The rising part 12 is connected to the anode terminal part 11, bent toward the anode leading part 31 located in the upper part of the anode terminal part 11 and extending in the packing resin 4. The bent part 13 is connected to the rising part 12, bent along the protruding direction of the anode leading part 31 shown by an arrow mark A and connected to the anode leading part 31. In the solid electrolytic capacitor of this embodiment, since the anode lead frame 1 formed by a simple working method such as a bending work can be connected to the anode leading part 31, a separate member such as a sleeper member and a special form member as usual do not need to be formed. Accordingly, a producing method becomes simple, the number of production processes can be reduced and a production cost can be reduced. Further, a member such as the sleeper member does not need to be interposed to connect the anode terminal part to the anode leading part so that a yield is not deteriorated due to unevenness in welding. Further, since the special form material does not need to be used, a material cost can be reduced.

A form of the anode lead frame constructing the solid electrolytic capacitor of this embodiment is illustrated in FIG. 2. In examples shown in FIGS. 2(a) to 2(c), the bent part 13 is gently bent from the rising part 12. In the example shown in FIG. 2(a), the bent part 13 is bent along the protruding direction (the arrow mark A) of the anode leading part 31 and the end of the bent part 13 is oriented downward. On the other hand, in the example shown in FIG. 2(b), the bent part 13 is bent along the direction shown by the arrow mark A and the end of the bent part 13 is oriented slantwise downward. Further, in the example shown in FIG. 2(c), the bent part 13 is bent along the direction shown by the arrow mark A and the end of the bent part 13 is directed substantially at right angles to the rising part 12. Further, in an example shown in FIG. 2(d), the bent part 13 is bent along the direction shown by the arrow mark A, however, a bending angle is smaller than 90°.

Figure 2A:
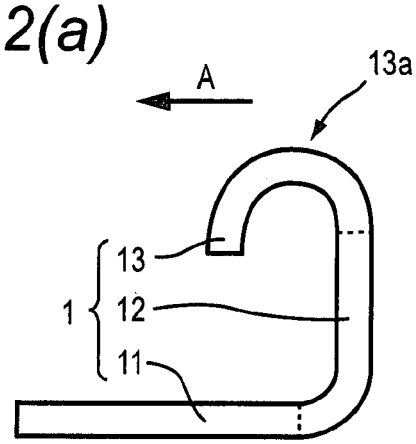
FIG. 2 is a diagram showing a form of an anode lead frame constructing the solid electrolytic capacitor of the first embodiment.
Figure 2B:
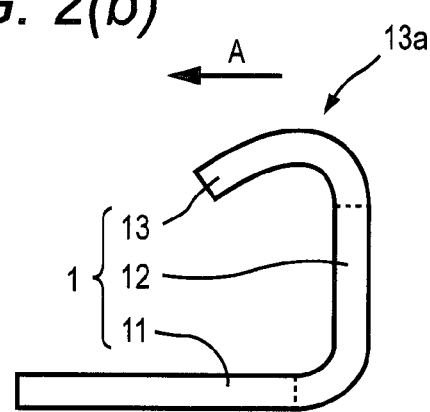
Figure 2C:
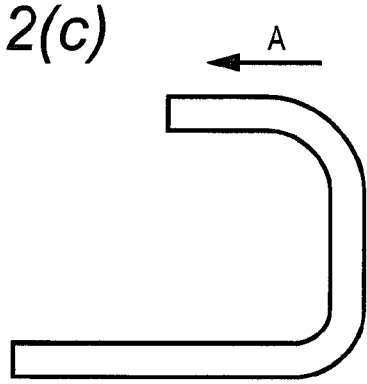
Figure 2D:
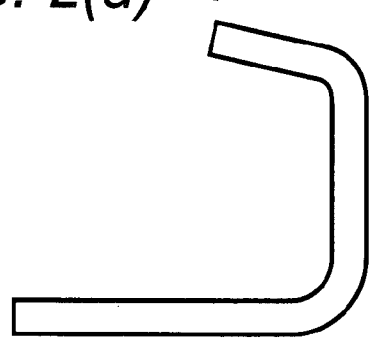

In all the anode lead frames 1 shown in FIGS. 2(a) to 2(d), the bent part 13 is connected to the rising part 12, bent along the protruding direction of the anode leading part shown by the arrow mark A and connected to the anode leading part. Accordingly, all the forms of the anode lead frame illustrated in FIGS. 2(a) to 2(d) belong to the anode lead frame forming the solid electrolytic capacitor of the present invention, and can be connected to the anode leading part without using the sleeper member and the special form material. Further, as in the anode lead frame having such a form as shown in FIGS. 2(a) and 2(b), in the case of the form that a connected part 13a of the bent part 13 to the anode leading part has a curvature, even if cut burs are produced in the anode leading part when the anode lead frame is welded to the anode leading part, both the members can be assuredly welded to each other. Thus, the above-described form is preferable in view of reducing an ESR.

Figure 3A:
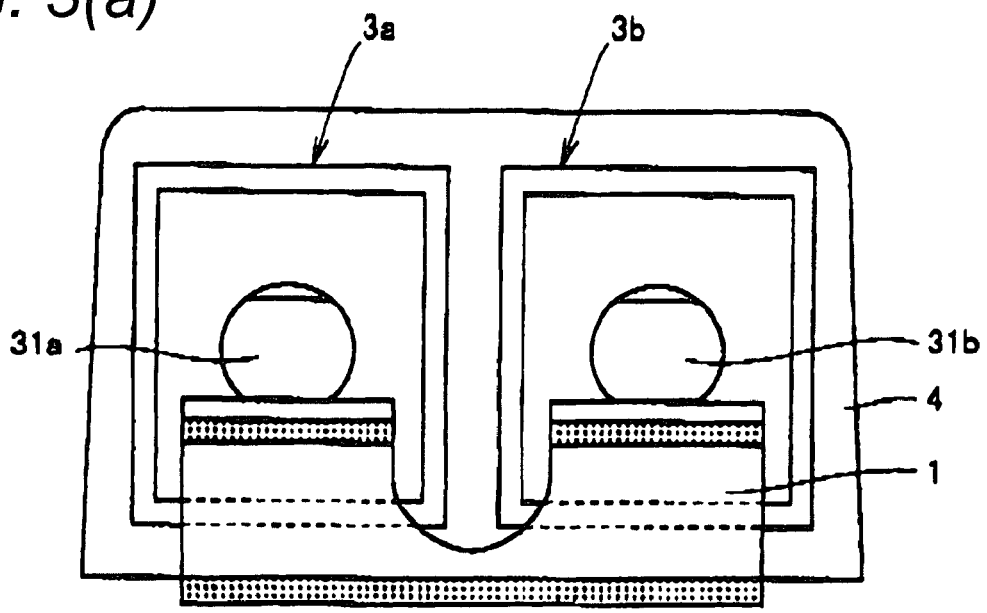
FIG. 3 is a diagram showing the structure of the solid electrolytic capacitor in the first embodiment.
Figure 3B:
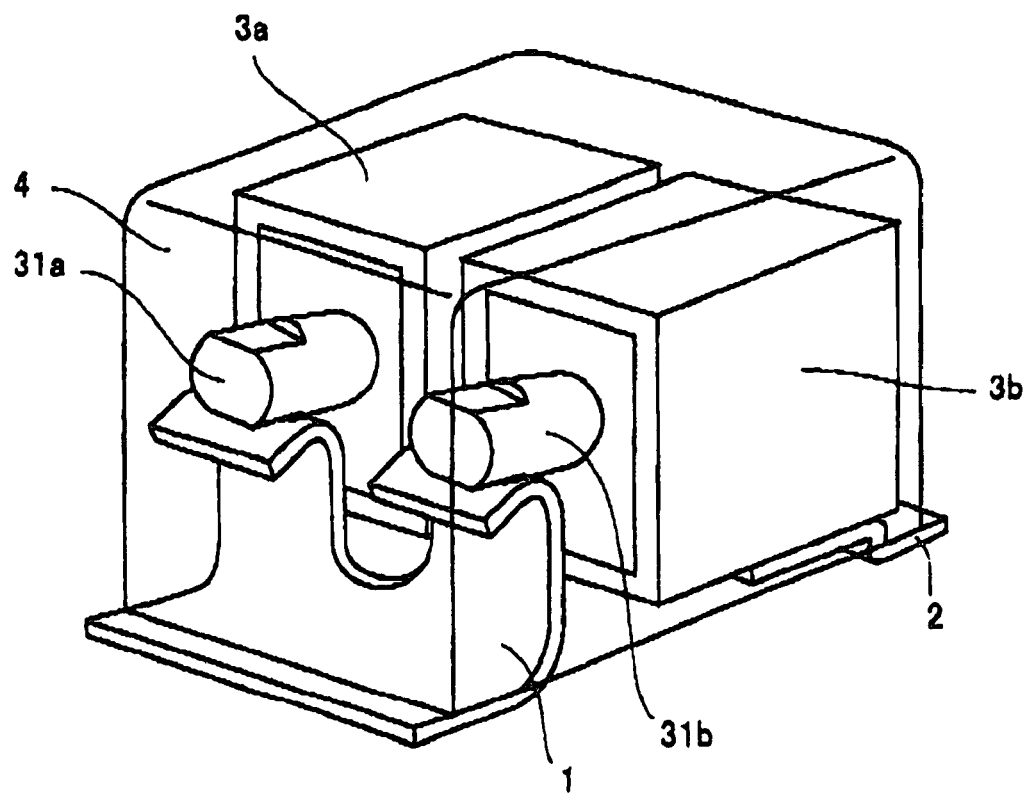

FIG. 3 illustrates the structure of the solid electrolytic capacitor in this embodiment. FIG. 3(a) is a side view showing the solid electrolytic capacitor seen from the protruding directions of anode leading parts 31a and 31b. FIG. 3(b) is a perspective view. In an example shown in FIG. 3, two capacitor elements 3a and 3b are provided and the anode leading parts 31a and 31b thereof are respectively connected to one anode lead frame 1. As shown in FIG. 3, a structure having a plurality of capacitor elements is preferable in view of reducing the ESR. Further, in this embodiment, as shown in FIG. 3, an example is shown that the anode lead frame 1 has no slit. When the anode lead frame 1 does not have the slit, in the anode leading parts 31a and 31b connected to the anode lead frame 1, parts connected to the anode lead frame 1 are preferably chamfered to be horizontal surfaces in view of increasing contact areas and reducing the ESR. The form of the anode leading part 31 in which the parts connected to the anode lead frame are chamfered to be the horizontal surfaces is illustrated in FIG. 1(a).

As shown in FIG. 1(c), in the anode lead frame 1 in the solid electrolytic capacitor of the present invention, the rising part 12 connected to the anode terminal part 11 is bent toward the anode leading part 31 located in an upper part and extends in the packing resin 4. Further, the bent part 13 connected to the rising part 12 is bent along the protruding direction of the anode leading part 31. Such a structure of the anode lead frame 1 can realize an anchoring action on the packing resin 4 to increase a mechanical strength of the solid electrolytic capacitor. Similarly, as shown in FIG. 1(b), when the cathode lead frame 2 connected to the cathode leading part 32 has a structure bent in a crank form, an anchoring action on the packing resin 4 can be realized to improve the mechanical strength of the solid electrolytic capacitor.

A producing method for the solid electrolytic capacitor in this embodiment includes a forming process of the anode lead frame, a forming process of the cathode lead frame, a connecting process of the capacitor element, and a forming process of the packing resin. The forming process of the anode lead frame is carried out in such a way, for instance, as shown in FIG. 1(c), that after the rising part 12 is formed by bending the end of the anode terminal part 11 upward, the end of the rising part 12 is further bent to form the bent part 13 so as to be connected to the anode leading part 31 of the capacitor element 3. The bent part 13 preferably has a form that the part connected to the anode leading part 31 has a curvature. In the forming process of the cathode lead frame, the crank shaped cathode lead frame 2, for instance such as shown in FIG. 1(b), can be formed by applying a bending work.

Figure 4A:
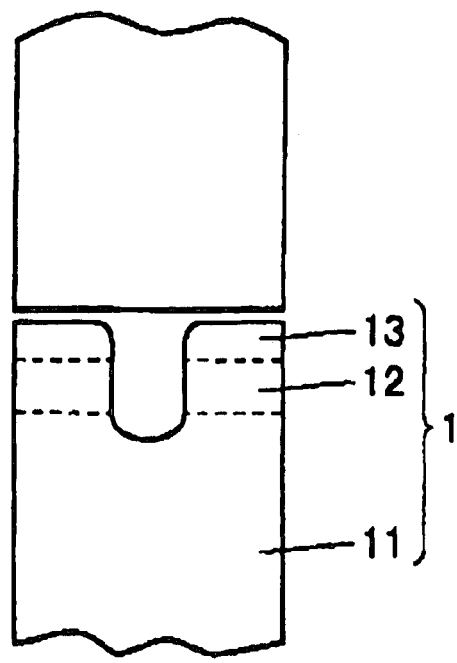
FIG. 4 is a diagram showing a producing method of the anode lead frame and a cathode lead frame in the first embodiment.
Figure 4B:
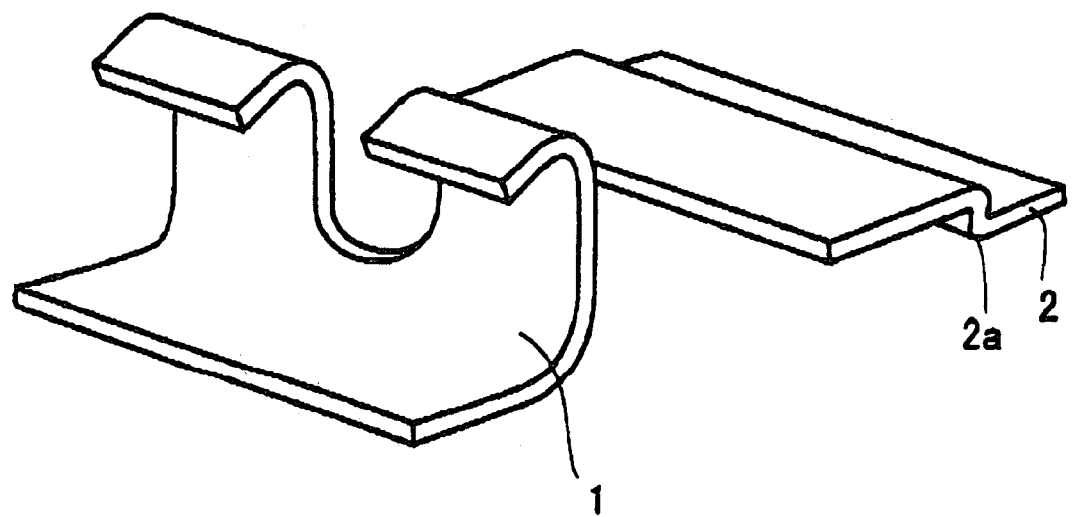
Figure 5A:
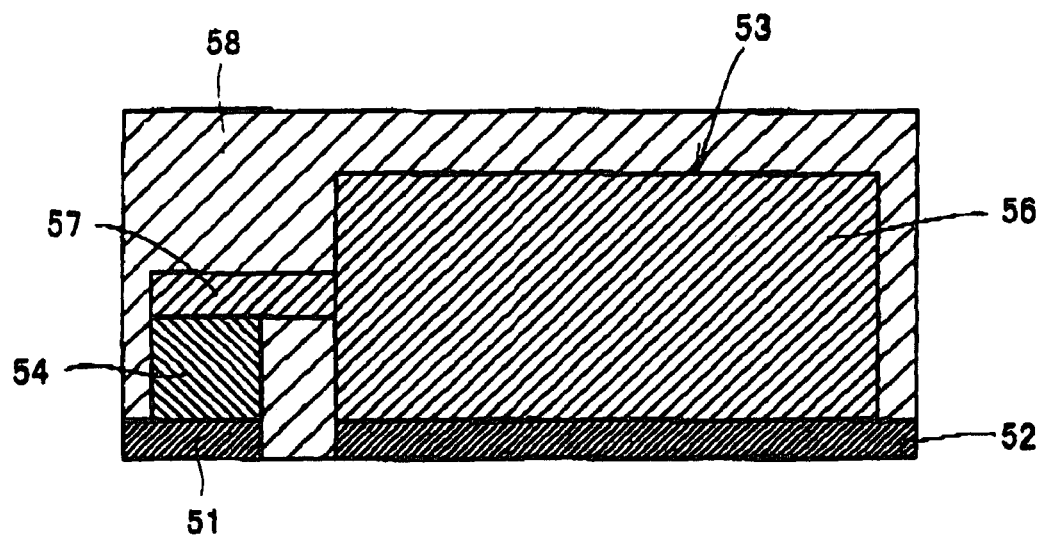
FIG. 5 is a diagram showing the structure of a usual solid electrolytic capacitor.
Figure 5B:
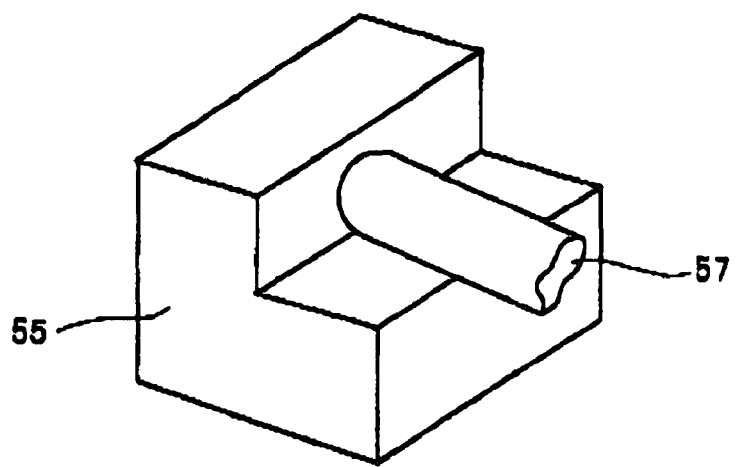

FIG. 4 is a diagram showing the producing method for the anode lead frame and the cathode lead frame in this embodiment. FIG. 4(a) is a plan view before the bending work and FIG. 4(b) is a perspective view after the bending work. FIG. 4(a) shows the parts of the anode terminal part 11, the rising part 12 and the bent part 13 respectively after the bending work. In an example shown in FIG. 4, the cathode lead frame 2 having a crank shaped step 2a is formed by the bending work. The solid electrolytic capacitor having two capacitor elements can be produce by the above-described anode lead frame 1 and the cathode lead frame 2. A lead plate before the bending work shown in FIG. 4(a) can be formed, for instance, by stamping a metal thin plate. A plurality of anode lead frames 1 and cathode lead frames 2 are formed at the same time so that a production cost can be reduced.

The connecting process of the capacitor element is carried out in such a way, as shown in FIG. 1(b), that the capacitor element 3 is arranged on the anode lead frame 1 and the cathode lead frame 2, and then, the anode lead frame 1 is connected to the anode leading part 31 and the cathode lead frame 2 is connected to the cathode leading part 32. Accordingly, in the sold state electrolytic capacitor of this embodiment, since the anode lead frame 1 formed by the bending work is connected to the anode leading part 31, the separate member such as the sleeper member and the special form material as in a related art does not need to be formed. Therefore, the number of production processes can be simplified, a production can be easily realized and a production cost can be reduced. Further, in order to connect the anode terminal part to the anode leading part, a member such as the sleeper member does not need to be used and a yield is not deteriorated due to unevenness in welding. Further, since the special form material does not need to be used, a material cost can be reduced. By applying an electrically conductive paste, welding, drying or sticking, a connection can be realized. As a welding process, a resistance welding process or a laser welding process is preferable.

In the forming process of the packing resin, the capacitor element 3 is sealed by an epoxy resin and so on. As shown in FIG. 1(b), when the capacitor element is sealed by the packing resin so that a bottom surface of the packing resin 4 is flush with the upper surface of the anode leading part 1 and the upper surface of the cathode leading part 2, the packing resin can be restrained from flushing to the lower ends of the anode lead frame 1 and the cathode lead frame 2. The capacitor element can be sealed by the packing resin, for instance, by arranging a frame member in the periphery of the capacitor element, then, injecting liquid packing resin into the frame member and then solidifying the packing resin. In such a way, the solid electrolytic capacitor can be produced.

Second Embodiment

Figure 6A:
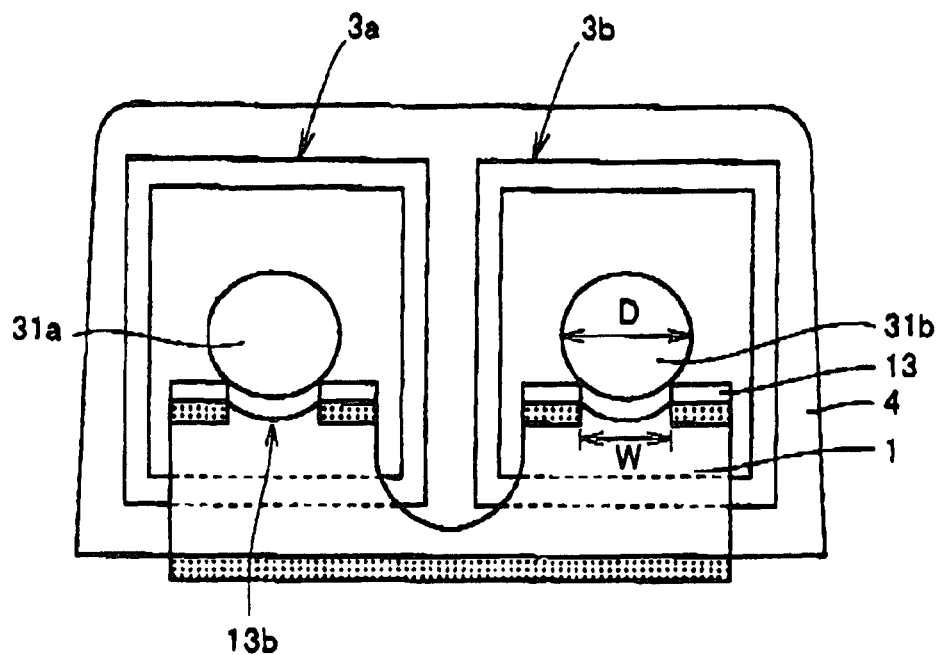
FIG. 6 is a diagram showing the structure of a solid electrolytic capacitor in a second embodiment.
Figure 6B:
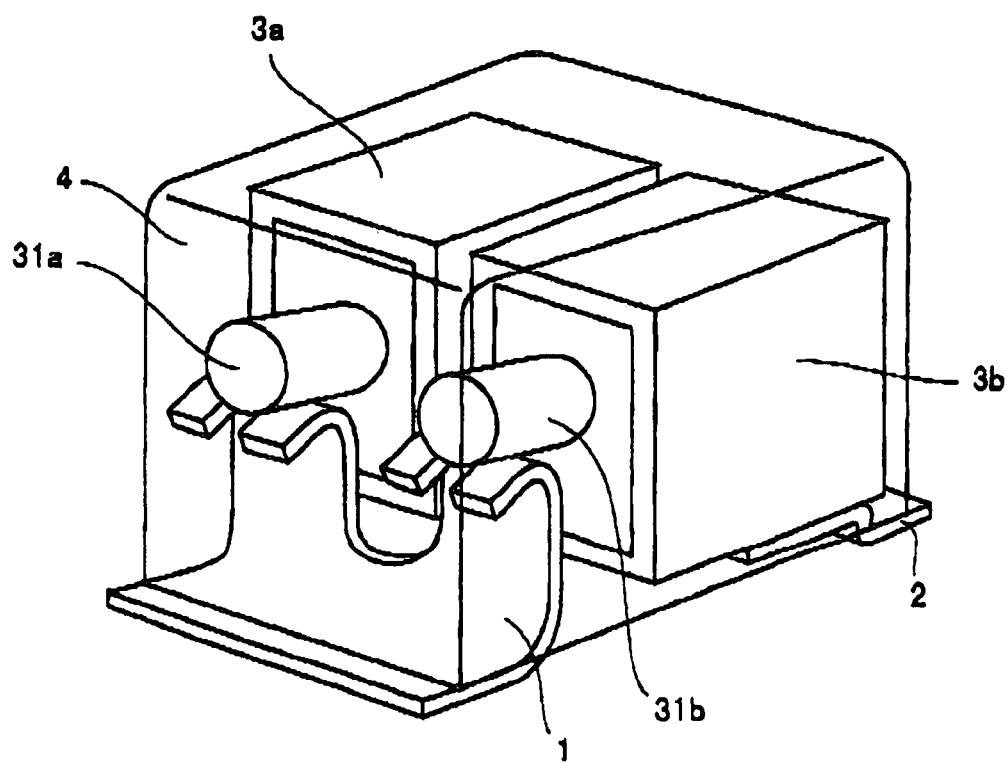

The structure of a solid electrolytic capacitor in this embodiment is illustrated in FIG. 6. FIG. 6(a) is a side view of the solid electrolytic capacitor seen from the protruding directions of anode leading parts 31a and 31b. FIG. 6(b) is a perspective view. As shown in FIG. 6(a), two capacitor elements 3a and 3b are provided and the anode leading parts 31a and 31b thereof are respectively connected to one anode lead frame 1. In this embodiment, the anode leading parts 31a and 31b have cylindrical forms differently from the first embodiment. Further, in this embodiment, a bent part 13 of the anode lead frame 1 has slits 13b opened along the protruding directions of the anode leading parts 31a and 31b from the capacitor elements 3a and 3b and the anode leading parts 31a and 31b are connected to the anode lead frame 1 in the slits 13b. Accordingly, the anode leading parts 31a and 31b come into linear contact with the anode lead frame 1 at two positions so that contact areas can be increased and an ESR can be reduced. Further, since the slits 13b are provided, a positional shift arising when the anode leading parts 31a and 31b are arranged on the bent part 13 can be suppressed. The structure of the solid electrolytic capacitor of this embodiment are the same as those of the structure of the solid electrolytic capacitor of the first embodiment in view of other points and achieves the same operational effects as those of the first embodiment.

As shown in FIG. 6(a), a relation between the maximum opening width W of the slit 13b in the horizontal direction and the maximum width D of the end faces of the anode leading parts 31a and 31b in the horizontal direction preferably satisfies $W \leq D$ to enhance the reliability of a connection between the anode leading parts and the bent part when the anode leading parts are arranged on the bent part. On the other hand, in order to allow the anode leading parts 31a and 31b to come into linear contact with the bent part 13 at a plurality of positions so as to reduce the ESR and to suppress the positional shift arising when the anode leading parts 31a and 31b are arranged on the bent part 13, a relation of $W \geq D \times \frac{1}{4}$ is preferable and a relation $W \geq D \times \frac{1}{2}$ is more preferable. Since the bent part 13 has the slits 13b, the anode leading parts may not be chamfered to maintain large contact areas and reduce the ESR. In FIG. 6, the forms of the anode leading parts 31a and 31b in this embodiment are illustrated.

Figure 7A:
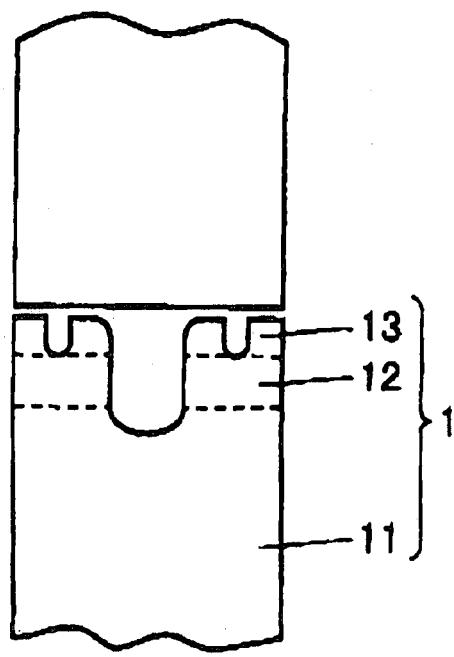
FIG. 7 is a diagram showing a producing method of an anode lead frame and a cathode lead frame in the second embodiment.
Figure 7B:
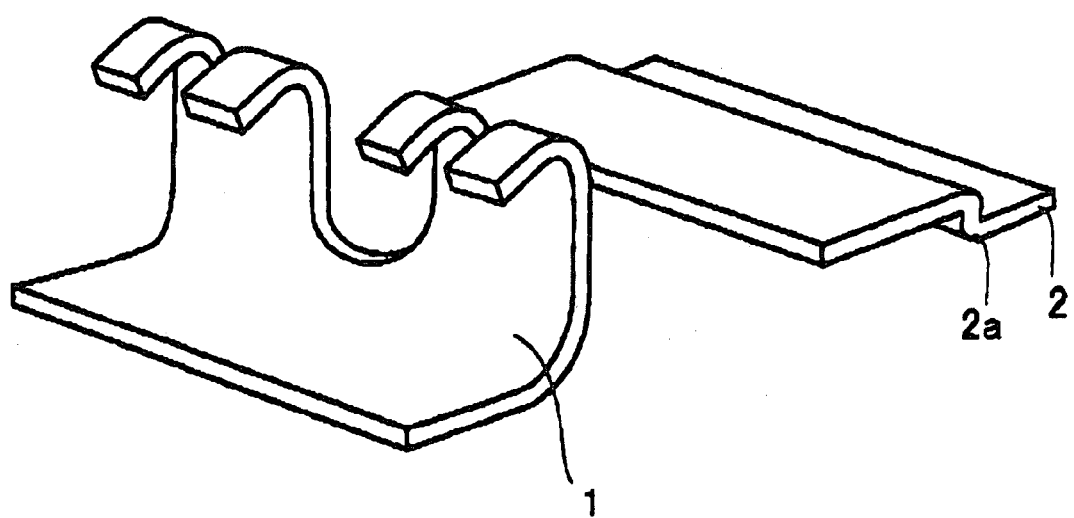

A producing method for the solid electrolytic capacitor in this embodiment includes a forming process of the anode lead frame, a forming process of a cathode lead frame, a connecting process of the capacitor element, and a forming process of an packing resin. FIG. 7 is a diagram showing the producing method for the anode lead frame 1 and the cathode lead frame 2 in this embodiment. FIG. 7(a) is a plan view before a bending work and FIG. 7(b) is a perspective view after the bending work. FIG. 7(a) shows the parts of an anode terminal part 11, a rising part 12 and the bent part 13 respectively after the bending work. Cutout parts are previously formed before the bending work so that the slits 13b can be formed in the bent part 13. In an example shown in FIG. 7, the cathode lead frame 2 having a crank shaped step 2a is formed by the bending work. A lead plate before the bending work shown in FIG. 7(a) can be formed, for instance, by stamping a metal thin plate. The forming process of the anode lead frame is carried out in such a way, for instance, that after the rising part 12 is formed by bending the end of the anode terminal part 11 upward, the end of the rising part 12 is further bent to form the bent part 13 connected to the anode leading part 31 of the capacitor element 3. The bent part 13 preferably has a form that a part connected to the anode leading part 31 has a curvature.

The connecting process of the capacitor element is carried out in such a way, as shown in FIG. 1(b), that the capacitor element 3 is arranged on the anode lead frame 1 and the cathode lead frame 2, and then, the anode lead frame 1 is connected to the anode leading part 31 and the cathode lead frame 2 is connected to the cathode leading part 32. In the sold state electrolytic capacitor, since the anode lead frame 1 formed by the bending work is connected to the anode leading part 31, a separate member does not need to be formed. Therefore, the number of production processes can be simplified, a production can be easily realized and a production cost can be reduced. Further, since the separate member does not need to be formed, a yield is not deteriorated. A connection of the anode lead frame to the anode leading part is preferably carried out in such a way, as shown in FIG. 6, that the anode leading parts 31a and 31b are initially mounted on the slits 13b of the bent part 13, and then, the bent part is connected to the anode leading parts. In such a connecting form, the bent part 13 can be assuredly connected to the anode leading parts 31a and 31b without the positional shift of the anode leading parts 31a and 31b. The anode lead frame and the cathode lead frame can be connected to the capacitor element by applying, drying and sticking an electrically conductive paste, or welding. In the forming process of the packing resin, the capacitor element is sealed by an epoxy resin and so on. The solid electrolytic capacitor of the second embodiment is the same as the solid electrolytic capacitor of the first embodiment in view of other points.

Further, although in the first and the second embodiments the bent part is bent along the protruding direction of the anode leading part, the bent part can be bent along in a direction that is parallel to and opposite to the protruding direction of the anode leading part.

Figure 8A:
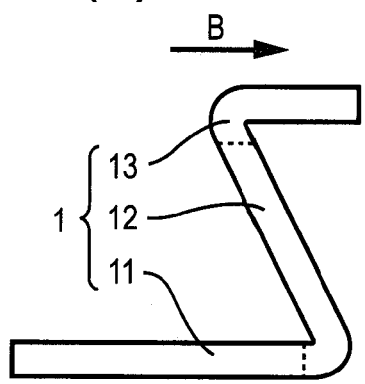
FIG. 8 is a diagram showing a different form of an anode lead frame constructing the solid electrolytic capacitor in the first and second embodiments.
Figure 8B:
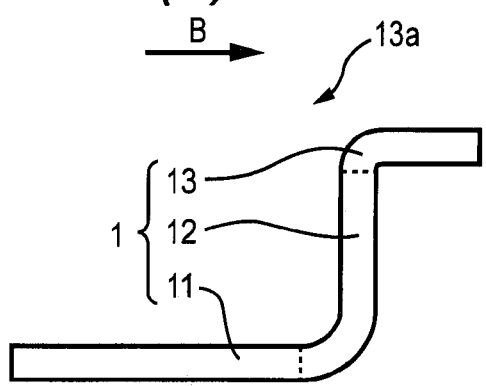
Figure 8C:
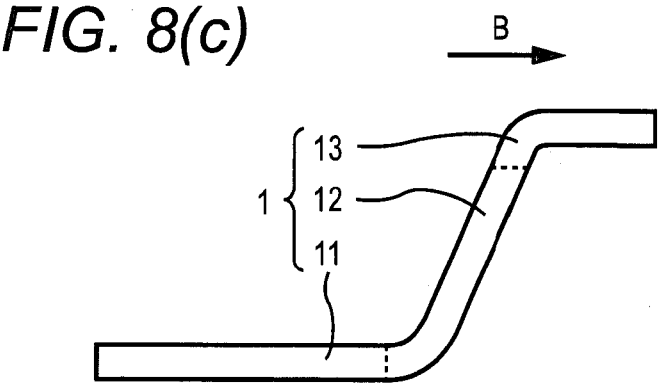

Its different form of the anode lead frame constructing the solid electrolytic capacitor in the first and second embodiments is illustrated in FIG. 8(a) to 8(c).

The anode lead frame 1 includes an anode terminal part 11, a rising part 12 that is connected to the anode terminal part 11 and a bent part 13 that is connected to the rising part 12. Herein, the anode terminal part 11 is configured as same as the first and second embodiments, however, in the example shown in FIG. 8(a), the rising part 12 is bent and extended obliquely backward and the bent part 13 is bent along the direction shown by an arrow mark B, in the example shown in FIG. 8(b), although the rising part 12 is bent upward as same as the first and second embodiments, the bent part 13 is bent along the direction shown by an arrow mark B, also in the example shown in FIG. 8(c), the rising part 12 is bent and extended obliquely forward and the bent part 13 is further bent along the direction that is shown by an arrow mark B. Herein, as matter of fact, the end of the bent part 13 can be oriented downward, slantwise downward, substantially at right angles to the rising part 12, or slantwise upward, as shown in FIG. 2(a) to 2(d). Also, the bent part can have an opened slit as the second embodiment. The structure of the solid electrolytic capacitor having this different form of the anode lead frame is the same as those of the structure of the solid electrolytic capacitor of the first and second embodiments in view of other points and achieves the same operational effects as those of the first and second embodiments.

In addition, in a case of comparing FIGS. 8(b) and 8(c) with FIG. 8(a), the length of the anode lead frame 1 of FIG. 8(a) in the horizontal direction can be shorten because the rising part 12 is bent and extended obliquely backward. Thus the size of the solid electrolytic capacitor of FIG. 8(a) can be smaller than those of FIGS. 8(b) and 8(c).

In the solid electrolytic capacitor of the present invention, since the number of production processes is small, its production can be easily realized, its cost is low and an ESR is low.

What is claimed is:

1. A solid electrolytic capacitor, comprising:
    a capacitor element having an anode leading part and a cathode leading part, the anode leading part protruding from one end face of the capacitor element;
    an anode lead frame connected to the anode leading part;
    a cathode lead frame connected to the cathode leading part; and
    an packing resin covering the capacitor element;
    wherein the anode lead frame includes:
        an anode terminal part having an exposed surface exposed from the packing resin,
        a rising part connected to the anode terminal part, bent toward the anode leading part located above the anode terminal part and extending in the packing resin, and
        a bent part connected to the rising part and bent along a direction which is parallel to a protruding direction of the anode leading part and connected to the anode leading part.

2. The solid electrolytic capacitor according to claim 1, wherein the bent part has a slit opened along the protruding direction of the anode leading part from the capacitor element.

3. The solid electrolytic capacitor according to claim 2, wherein a maximum opening width of the slit in the horizontal direction is equal to or smaller than a maximum width of the end face of the anode leading part in the horizontal direction.

4. The solid electrolytic capacitor according to claim 1, wherein a part of the bent part connected to the anode leading part has a curvature.

5. The solid electrolytic capacitor according to claim 1, wherein a plurality of the capacitor elements are provided.

6. The solid electrolytic capacitor according to claim 1, wherein the anode leading part comprises an end collapsed.

\* \* \* \* \*